United States Patent
Hachinota

(10) Patent No.: US 7,292,595 B2
(45) Date of Patent: Nov. 6, 2007

(54) INPUT BUFFER TYPE PACKET SWITCHING EQUIPMENT

(75) Inventor: Masashi Hachinota, Tokyo (JP)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 09/750,688

(22) Filed: Jan. 2, 2001

(65) Prior Publication Data

US 2001/0007563 A1   Jul. 12, 2001

(30) Foreign Application Priority Data

Jan. 7, 2000   (JP) .............................. 2000-001287

(51) Int. Cl.
*H04L 12/28* (2006.01)
*G06F 13/38* (2006.01)
(52) U.S. Cl. ......................................... 370/415; 710/52
(58) Field of Classification Search ......... 370/412–416
See application file for complete search history.

(56) References Cited

U.S. PATENT DOCUMENTS 5,267,235 A   11/1993   Thacker (Continued)

FOREIGN PATENT DOCUMENTS

JP   02-158243 A   6/1990

(Continued)

OTHER PUBLICATIONS

4. H. Kim et al., "A High-Speed ATM Switch Architecture Using Random Access Input Buffers and Multi-Cell-Time Arbitration", *IEEE*, vol. 1, Nov. 3, 1997, pp. 536-540.

*Primary Examiner*—Steven Nguyen
(74) *Attorney, Agent, or Firm*—Sughrue Mion Pllc.

(57) ABSTRACT

Input buffer type packet switching equipment, which can output cells to an external output line having a slower output line rate than a corresponding input line rate without having buffers in its output line sections, is provided. The input buffer type packet switching equipment provides M input line buffers that store cells inputted from M input lines temporarily in a state that one of the M input line buffers stores cells inputted from corresponding one of the M input lines, in this the M is an integer being 2 or more, an M×N crossbar type switch, which provides N output lines, for switching cells outputted from the M input line buffers based on a cross point on/off control signal, in this N is an integer being 2 or more. The input buffer type packet switching equipment further provides N output line sections, which are provided for each of the N output lines of the M×N crossbar type switch, for outputting cells applied switching at the M×N crossbar type switch to N external output lines, and an arbiter that outputs a connection permission signal to one of the M input line buffers based on connection request signals outputted from the M input line buffers, and also outputs the cross point on/off control signal to the M×N crossbar type switch, and outputs the connection permission signal at a designated slower timing interval than a normal timing interval to one input line buffer that outputs cells to an external output line whose output line rate is slower than a corresponding input line rate. With this, the timing interval outputting the cells from one of the M input line buffers to the M×N crossbar type switch is made to be wider than the normal timing interval, therefore buffers in the output line sections are not needed.

10 Claims, 4 Drawing Sheets

U.S. PATENT DOCUMENTS

| | | | |
|---|---|---|---|
| 5,742,606 A * | 4/1998 | Iliadis et al. | 370/413 |
| 5,996,019 A | 11/1999 | Hauser et al. | |
| 6,072,772 A * | 6/2000 | Charny et al. | 370/229 |
| 6,343,066 B2 * | 1/2002 | Magill et al. | 370/412 |

FOREIGN PATENT DOCUMENTS

| | | |
|---|---|---|
| JP | 05-14397 A | 1/1993 |
| JP | 07-66806 A | 3/1995 |
| JP | 7-245610 A | 9/1995 |
| JP | 09-321768 A | 12/1997 |
| JP | 10-135971 A | 5/1998 |
| JP | 2000-13403 A | 1/2000 |
| JP | 2001-024641 A | 1/2001 |
| WO | WO99/40754 A1 | 8/1999 |

* cited by examiner 106-1~106-M: CONNECTION REQUEST SIGNAL
112-1~112-M: CONNECTION PERMISSION SIGNAL
       109: CROSS POINT ON/OFF CONTROL SIGNAL
       205: MASK SIGNAL
       206: MASK CANCELLATION SIGNAL

INPUT BUFFER TYPE PACKET SWITCHING EQUIPMENT

BACKGROUND OF THE INVENTION

The present invention relates to input buffer type packet switching equipment in which cells inputted through input line buffers are switched and outputted to external output lines.

DESCRIPTION OF THE RELATED ART

FIG. 1 is a block diagram showing a structure of conventional input buffer type packet switching equipment. As shown in FIG. 1, the conventional input buffer type packet switching equipment consists of M input line buffers 402 corresponding to each of M input lines 401, an arbiter 407, an M×N crossbar type switch 410, and N output line sections 413. In this, the M is the number of the input lines 401 and the N is the number of external output lines. And each of the M input line buffers 402 provides a distributor 403 that distributes cells inputted from each of the M input lines 401, N first in first out memories (FIFOs) 404, and a selector 405 that selects cells stored in one of the N FIFOs 404. And also each of the N output line sections 413 provides a buffer 414. And the number of output lines 411 of the M×N crossbar type switch 410 is also N.

The distributor 403 supplies cells to corresponding one of the FIFOs 404 based on an external output line number obtained from header information of the cells inputted from one of the M input lines 401, and makes the corresponding FIFO 404 store the cells temporarily. The selector 405 selects one of the FIFOs 404 to be read, based on a connection permission signal 412 from the arbiter 407. And the selector 405 outputs the cell read from one of the FIFOs 404 to the M×N crossbar type switch 410. The arbiter 407 supplies a cross point switch on/off control signal 409 to the M×N crossbar type switch 410, based on a connection request signal 406 outputted from one of the FIFOs 404 in one of the input line buffers 402. And also the arbiter 407 supplies a connection permission signal 412 to one of the M input line buffers 402.

The M×N crossbar type switch 410 switches the cells inputted from the M input line buffers 402 through switch input lines 408. The cells switched at the M×N crossbar type switch 410 are supplied to the output line sections 413 through output lines 411.

As mentioned above, the conventional input buffer type packet switching equipment has a structure to avoid the occurrence of blocking of cells, and to increase the throughput and to decrease the discarding rate of cells at the high traffic. That is, at the conventional input buffer type packet switching equipment, the N FIFOs 404 are provided every external output line, corresponding to the number of output lines 411 of the M×N crossbar type switch 410, and the arbiter 407 decides what FIFO is used to output cells, and outputs one of the connection permission signals 412 to each of the M input line buffers 402.

However, at the conventional input buffer type packet switching equipment, when an external output line whose output line rate is slower than the corresponding input line rate exists, for example, in case that an output line # 2 (external output line) is the slower line, after switching is executed at the M×N crossbar type switch 410 to the cells for the output line # 2, the cells are stored temporarily in the buffer 414 in the output line section # 2 413, and after this the cells are read by the rate being slower than the input line rate. Therefore, even N FIFOs 404 are provided in each of the M input line buffers 402, corresponding to the N output lines 411 from the M×N crossbar type switch 410, the buffer 414 is needed in each of the output line sections 413. Consequently, there are problems that the size of the input buffer type packet switching equipment is made to be large and also the cost is increased.

SUMMARY OF THE INVENTION

It is therefore an object of the present invention to provide input buffer type packet switching equipment that can output cells to an external output line having a slower output line rate than a corresponding input line rate with reducing the size of the input buffer type packet switching equipment.

According to the present invention for achieving the object mentioned above, there is provided input buffer type packet switching equipment. The input buffer type packet switching equipment provides M input line buffers that store cells inputted from M input lines temporarily in a state that one of the M input line buffers stores cells inputted from corresponding one of the M input lines, in this the M is an integer being 2 or more, an M×N crossbar type switch, which provides N output lines, for switching cells outputted from the M input line buffers based on a cross point on/off control signal, in this N is an integer being 2 or more, N output line sections, which are provided for each of the N output lines of the M×N crossbar type switch, for outputting cells applied switching at the M×N crossbar type switch to N external output lines, and an arbiter that outputs a connection permission signal to one of the M input line buffers based on connection request signals outputted from the M input line buffers, and also outputs the cross point on/off control signal to the M×N crossbar type switch, and outputs the connection permission signal at a designated slower timing interval than a normal timing interval to one input line buffer that outputs cells to an external output line whose output line rate is slower than a corresponding input line rate.

According to the present invention, in case that cells are outputted to an external output line whose output line rate is slower than an input line rate of the corresponding input line, a timing interval outputting the cells to the M×N crossbar type switch from the input line is made to be wider than a normal timing interval that is used at the time when the output line rate is the same that the input line rate of the corresponding input line has. The cells switched at the M×N crossbar type switch at a designated slower rate than the input line rate can be outputted to the external output line.

According to the present invention, for achieving the object mentioned above, there is provided an output line rate converting method at input buffer type packet switching equipment. The output line rate converting method, at the input buffer type packet switching equipment, which provides M input line buffers that store cells inputted from M input lines temporarily in a state that one of the M input line buffers stores cells inputted from corresponding one of the M input lines, in this the M is an integer being 2 or more, an M×N crossbar type switch, which provides N output lines, for switching cells outputted from the M input line buffers based on a cross point on/off control signal, in this N is an integer being 2 or more, N output line sections, which are provided for each of the N output lines of the M×N crossbar type switch, for outputting cells applied switching at the M×N crossbar type switch to N external output lines, and an arbiter that outputs a connection permission signal to one of the M input line buffers based on connection request signals outputted from the M input line buffers, and also outputs the cross point on/off control signal to the M×N crossbar type switch, the arbiter provides the step of; outputting the connection permission signal to one of the M input line buffers by using a designated slower timing interval than a normal timing interval in case that cells are outputted to an external output line whose output line rate is slower than a corresponding input line rate.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
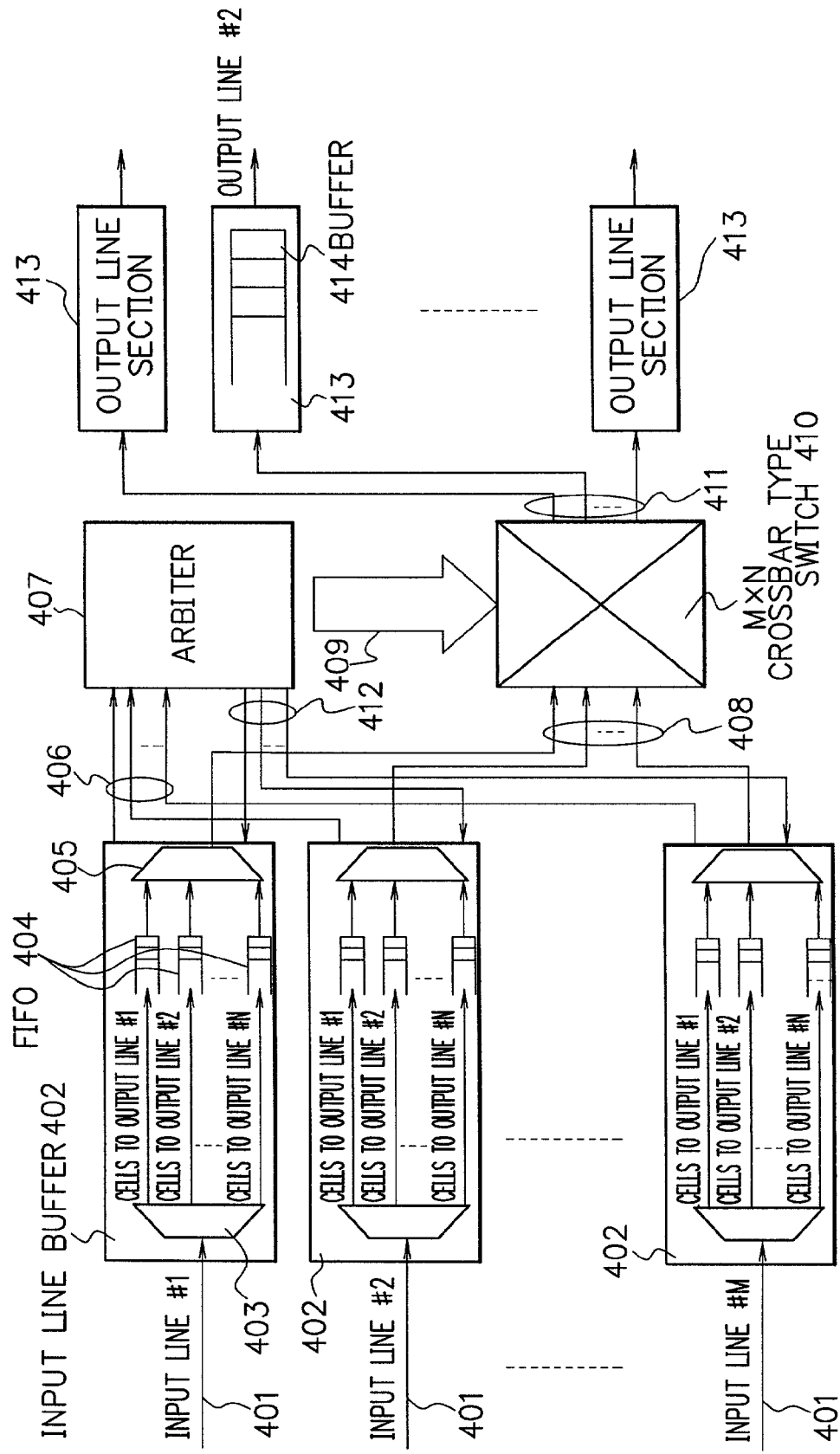
FIG. 1 is a block diagram showing a structure of conventional input buffer type packet switching equipment.
Figure 2:
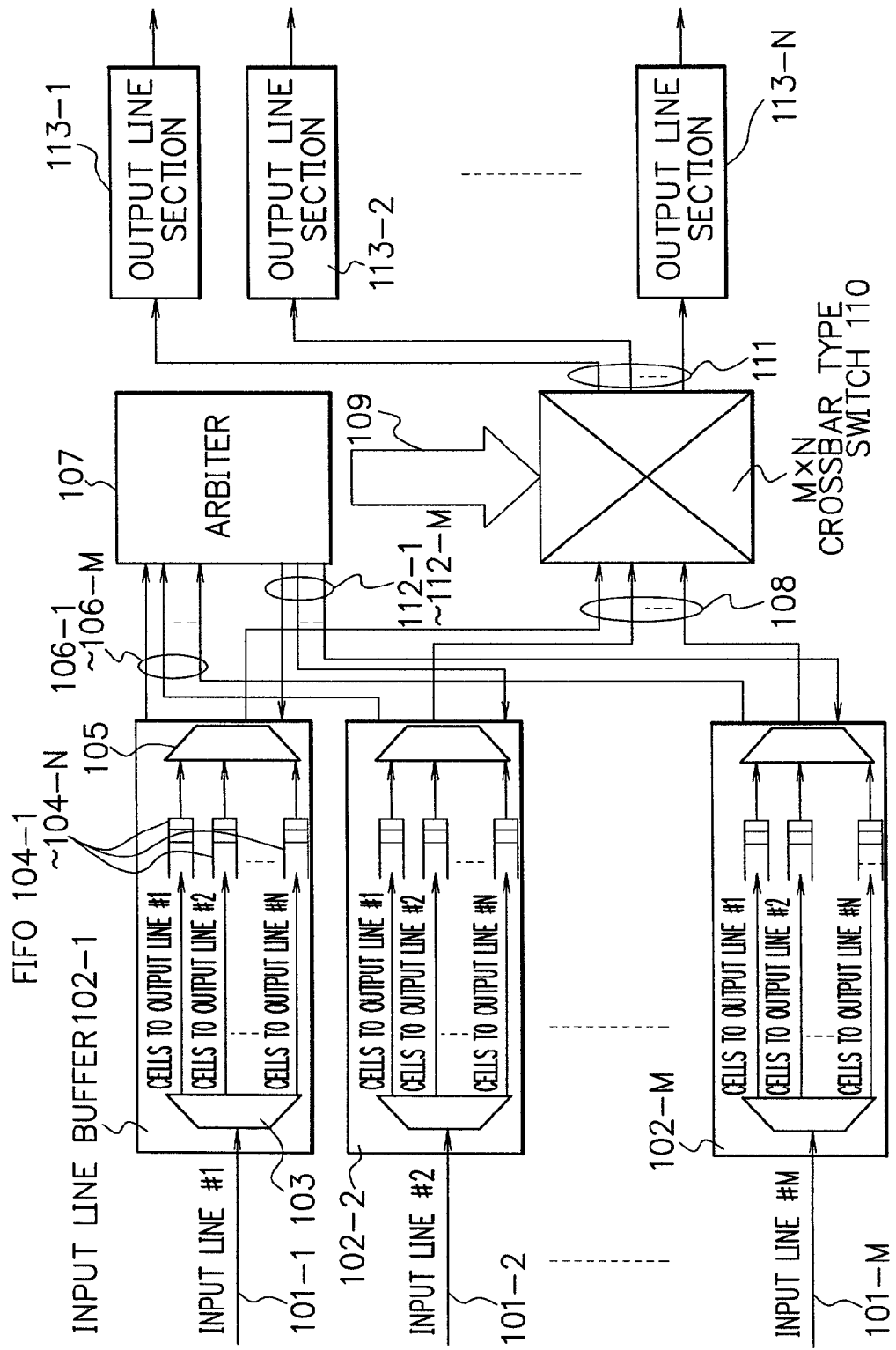
FIG. 2 is a block diagram showing a structure of an embodiment of input buffer type packet switching equipment of the present invention.

Referring now to the drawings, an embodiment of the present invention is explained in detail. FIG. 2 is a block diagram showing a structure of the embodiment of input buffer type packet switching equipment of the present invention.

As shown in FIG. 2, the embodiment of the input buffer type packet switching equipment of the present invention provides plural M input line buffers 102-1 to 102-M that store cells inputted separately from plural M input lines 101-1 to 101-M through the connection shown in FIG. 2, an M×N crossbar type switch 110 that switches the cells, which are read from the plural M input line buffers 102-1 to 102-M and are inputted through switch input lines 108, and outputs the switched cells to N output lines 111, an arbiter 107 that supplies a cross point on/off control signal 109 to the M×N crossbar type switch 110 based on connection request signals 106-1 to 106-M outputted from selectors 105 in the input line buffers 102-1 to 102-M, and also supplies connection permission signals 112-1 to 112-M to the input line buffers 102-1 to 102-M, and output line sections 113-1 to 113-N that output the cells applied switching at the M×N crossbar type switch 110 to the external output lines. In this, the M signifies the number of the input lines 101 and the N signifies the number of the output lines 111 and the number of the external output lines.

Each of the input line buffers 102-1 to 102-M provides N FIFOs 104-1 to 104-N, a distributor 103 that distributes inputted cells to the N FIFOs 104-1 to 104-N by corresponding to the external output line number obtained from header information of the inputted cells, and the selector 105 that selects one of the FIFOs 104-1 to 104-N to be read based on the connection permission signals 112-1 to 112-M supplied from the arbiter 107. And the connection request signals 106-1 to 106-M are outputted from the FIFOs through the selector 105 to the arbiter 107.

Figure 3:
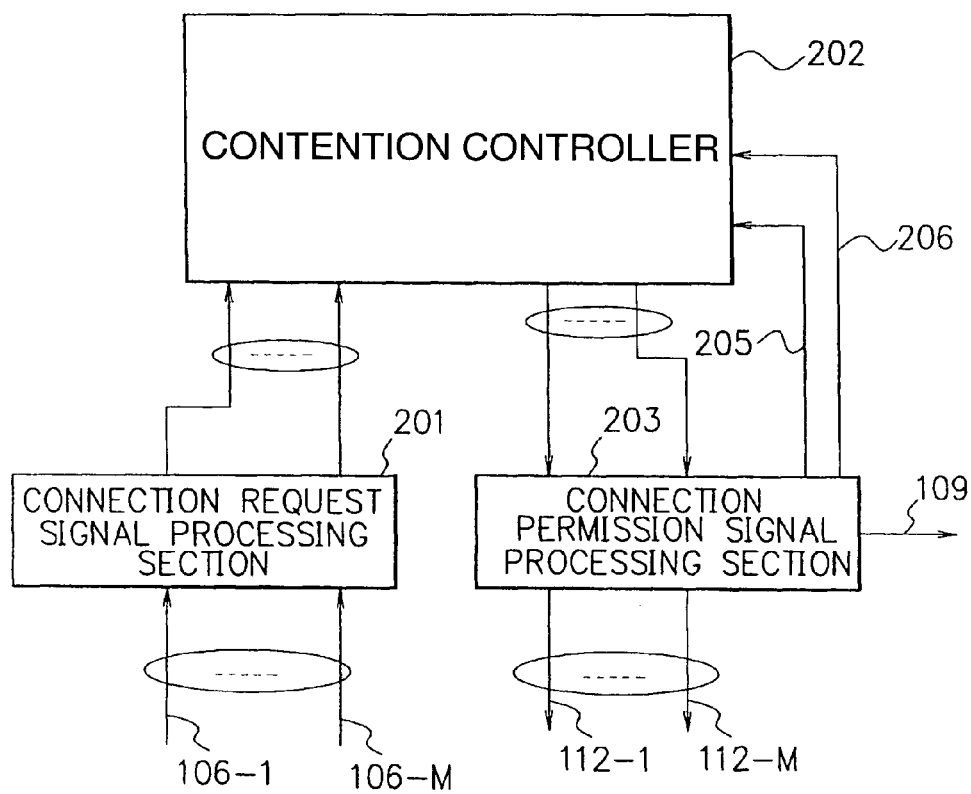
FIG. 3 is a block diagram showing a structure of an arbiter shown in FIG. 2.

FIG. 3 is a block diagram showing a structure of the arbiter 107 shown in FIG. 2. As shown in FIG. 3, the arbiter 107 consists of a connection request signal processing section 201 that receives the connection request signals 106-1 to 106-M from the plural M input line buffers 102-1 to 102-M and processes the received signals, a contention controller 202 that decides from what FIFOs cells for output lines 111 are read based on the connection request signals 106-1 to 106-M received from the connection request signal processing section 201, a connection permission signal processing section 203 that outputs connection permission signals 112-1 to 112-M to each of the M input line buffers 102-1 to 102-M based on the decided result of correspondence between the input line and the external output line at the contention controller 202 and also outputs the cross point on/off control signal 109 to the M×N crossbar type switch 110.

And in case that the connection permission was given to one of the M input line buffers 102-1 to 102-M, whose corresponding external output line has a slower output line rate than the input line rate, the connection permission signal processing section 203 outputs a mask signal 205 that notifies the contention controller 202 so that the contention controller 202 does not execute the contention control for the external output line for a designated time, and also outputs a mask cancellation signal 206 for canceling the mask to the contention controller 202.

In case that an external output line whose output line rate is slower than a corresponding input line rate exists and cells from each of the input lines 101-1 to 101-M are outputted to the external output line, when the cells are outputted by timing of a normal input line rate, the output line sections 113-1 to 113-N must read cells at the slower output line rate than the input line rate to the external output line, consequently, the cells are overflowed.

In order to avoid overflowing the cells, at the embodiment of the input buffer type packet switching equipment of the present invention, in case that the cells are outputted to the external output line whose output line rate is slower than the corresponding input line rate, output timing intervals of the connection permission signals 112-1 to 112-M to the M input line buffers 102-1 to 102-M from the arbiter 107 are adjusted to the timing to meet the slower rate than the input line rate. Therefore, the arriving interval of cells from each of the M input lines 101-1 to 101-M to the output line 111 becomes the output line rate being slower than the input line rate, consequently the cells are read at the designated rate to the external output line, and the cells are not overflowed.

Next, referring to FIG. 2, operation of the embodiment of the input buffer type packet switching equipment of the present invention is explained. When the M input line buffers 102-1 to 102-M, which store cells inputted from the M input lines 101-1 to 101-M temporarily, are notified the permission that outputs cells for an external output line whose output line rate is slower than the corresponding input line rate by connection permission signals 112-1 to 112-M from the arbiter 107, the cells are outputted from one of the FIFOs 104 in one of the M input line buffers 102-1 to 102-M corresponding to the external output line through the M×N crossbar type switch 110 via the selector 105 and the switch input line 108.

After this, a different input line buffer 102 in the plural M input line buffers 102-1 to 102-M receives a connection permission signal 112 for an external output line, and cells in the FIFO 104 in the different input line buffer 102 corresponding to the external output line are outputted to the M×N crossbar type switch 110 through the selector 105 and the switch input line 108.

Figure 4:
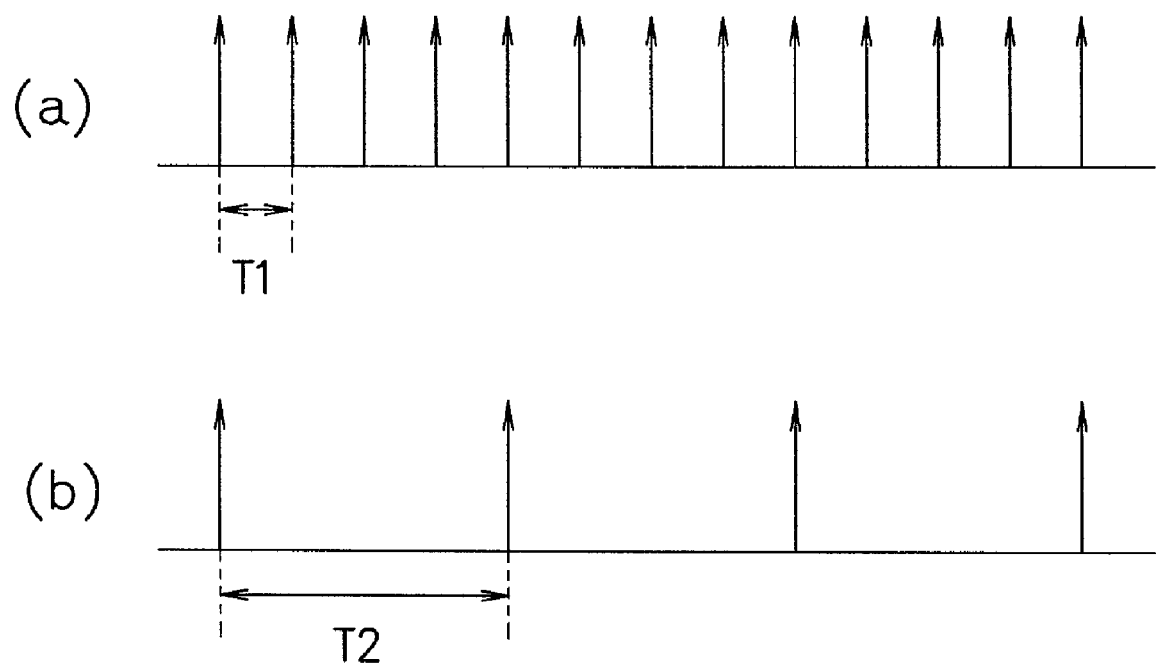
FIG. 4 is a timing interval chart of a connection permission signal outputted from a connection permission signal processing section in FIG. 3.

FIG. 4 is a timing interval chart of the connection permission signal 112 outputted from the connection permission signal processing section 203 in FIG. 3. As shown in FIG. 4, in case that an external output line has a slower line output rate than a corresponding input line rate, the timing interval outputting cells becomes T2 shown in FIG. 4(b), which is "n" times wider than a normal timing interval T1 shown in FIG. 4(a). In FIG. 4, for example, the T2 became 4 times wider than the T1.

Next, referring to FIG. 3, a method, which makes the output timing interval of the connection permission signal wide, is explained. When the contention controller 202 decides connection permission to an external output line whose output line rate is slower than an corresponding input line rate, the connection permission signal processing section 203 outputs one of connection permission signals 112-1 to 112-M to the input line buffer 102 that outputs cells to the external output line, and also notifies the contention controller 202 by using a mask signal 205 so that the contention controller does not execute the contention control for the external output line at the normal timing interval for the next "n−1" times. For example, in case that the "n"=4, "n−1"=3, therefore, during the timing interval T2, the T1 does not occur.

When the mask signal 205 was inputted to the contention controller 202, the contention controller 202 does not execute the contention control for the external output line. After the connection permission signal processing section 203 notified the mask signal 205 to the contention controller 202, when "n−1" times of the normal timing interval passed, the connection permission signal processing section 203 notifies the mask cancellation signal 206 to the contention controller 202. The contention controller 202 received the mask cancellation signal 206 begins the contention control for external output lines again.

In case that the contention controller 202 gives again the connection permission to an input line buffer whose corresponding external output line rate is slower than a corresponding input line rate, the connection permission signal processing section 203 outputs one of connection permission signals 112-1 to 112-M to the input line buffer 102 that outputs cells to the external output line. And also the connection permission signal processing section 203 notifies the mask signal 205 and the mask cancellation signal 206 to the contention controller 202. As a result, as shown in FIG. 4(b), the timing interval T2 of the connection permission to each of the input lines 101 for the external output line whose output line rate is slower than the corresponding input line rate becomes wider than the normal timing interval T1. With this, the output line 111 can read cells for the external output line at the designated output line rate without any problem.

At an external output line having the same rate that a corresponding input line has, the connection permission is executed at the timing interval T1 shown in FIG. 4(a). Therefore, the cells are outputted without any influence from processes at the time when the output line rate is slower than the input line rate.

As mentioned above, according to the present invention, in case that cells are outputted to an external output line having a slower output line rate than the input line rate that an input line has, a timing interval outputting cells to a crossbar type switch from the input line is made to be wider than a normal timing interval at outputting the cells at the same rate that the input line has. With this, the cells are switched at the crossbar type switch at a designated slower rate than the input line has, and the switched cells are outputted. Consequently, outputting sections do not need to provide a buffer for storing cells temporarily, and the output line rate can be converted with reducing the size of the input buffer type packet switching equipment.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What is claimed is:

1. Input buffer packet switching equipment, comprising:
   M input line buffers that store cells inputted from M input lines temporarily in a state that one of said M input line buffers stores cells inputted from corresponding one of said M input lines, in this the M is an integer being 2 or more;
   an M×N crossbar switch, which provides N output lines for switching cells outputted from said M input line buffers based on a cross point on/off control signal, in this N is an integer being 2 or more;
   N output line sections, which are provided for each of said N output lines of said M×N crossbar switch, for outputting cells applied switching at said M×N crossbar switch to N external output lines; and
   an arbiter that outputs a connection permission signal to one of said M input line buffers based on connection request signals outputted from said M input line buffers, and also outputs said cross point on/off control signal to said M×N crossbar switch, and outputs said connection permission signal at a designated slower timing interval than a normal timing interval to one input line buffer that outputs cells to an external output line whose output line rate is slower than a corresponding input line rate,
   wherein said designated slower timing interval is a constant periodic rate which is slower than said corresponding input line rate, said designated slower timing interval is set so that arrival of cells at said output line sections is at a rate not greater than said output line rate, and buffer overflow and output overflow are prevented.

2. Input buffer packet switching equipment accordance with claim 1, wherein:
   said arbiter, comprising:
   a connection request signal processing section that receives said connection request signals from said M input line buffers and processes said received connection request signals;
   a contention controller for deciding that one of said M input line buffers requested the connection reads cells for what external output line based on the connection request from said M input line buffers outputted from said connection request signal processing section; and
   a connection permission signal processing section that outputs said connection permission signal to one of said M input line buffers based on the contention processed result from said contention controller and also outputs said cross point on/off control signal to said M×N crossbar switch, and wherein:
   in case that said connection permission is given to one input line buffer which outputs cells to the external output line whose output line rate is slower than the corresponding input line rate, said connection permission signal processing section controls so that said contention controller does not execute the contention control for a designated interval corresponding to the slower output line rate than the input line rate.

3. Input buffer packet switching equipment in accordance with claim 2, wherein:

in case that said connection permission is given to one input line buffer which output cells to the external output line whose output line rate is slower than the corresponding input line rate said connection permission signal processing section outputs a mask signal for stopping the contention control for a designated period to said contention controller and also outputs a mask cancellation signal for canceling the stopping of said contention control after passing said designated period to said contention controller.

4. Input buffer packet switching equipment in accordance with claim 3, wherein:

said designated period is designated times of a normal timing interval of said connection permission signal in the case that said connection permission is given to one input line buffer for an external output line whose output line rate is the same that the corresponding input line has.

5. Input buffer packet switching equipment in accordance with claim 1, wherein:

each of said M input line buffers comprising:

N FIFOs, whose number is the same that said output lines of said M×N crossbar switch have, for storing cells for said N external output lines temporarily and outputting said connection request signal at the time when said cells are stored;

a distributor that distributes cells inputted from said M input lines to each of said FIFOs, corresponding to said external output line obtained from header information of said cells; and a selector that selects one FIFO to be read corresponding to said connection permission signal inputted from said arbiter from said N FIFOs.

6. An input buffer packet switching equipment in which an output line rate is converted, the input buffer packet switching equipment comprising:

M input line buffers that store cells inputted from M input lines temporarily in a state that one of said M input line buffers stores cells inputted from corresponding one of said M input lines, in this the M is an integer being 2 or more;

an M×N crossbar switch, which provides N output lines for switching cells outputted from said M input line buffers based on a cross point on/off control signal, in this N is an integer being 2 or more;

N output line sections, which are provided for each of said N output lines of said M×N crossbar switch, for outputting cells applied switching at said M×N crossbar switch to N external output lines; and an arbiter that outputs a connection permission signal to one of said M input line buffers based on connection request signals outputted from said M input line buffers, and also outputs said cross point on/off control signal to said M×N crossbar switch, wherein said arbiter, outputs said connection permission signal to one of said M input line buffers by using a designated slower timing interval than a normal timing interval in case that cells are outputted to an external output line whose output line rate is slower than a corresponding input line rate, and wherein said designated slower timing interval is a constant periodic rate which is slower than said corresponding input line rate, said designated slower timing interval is set so that arrival of cells at said output line sections is at a rate not greater than said output line rate, and buffer overflow and output overflow are prevented.

7. A method of outputting data in packet switching, comprising:

storing data inputted from a plurality of input lines; and selectively outputting said stored data to a plurality of external line sections;

wherein said stored data output to an external line section with an output line rate slower than a corresponding input line rate is outputted at a designated rate slower than said corresponding input line rate, and wherein said designated slower rate is a constant periodic rate which is slower than said corresponding input line rate, said designated slower rate is set so that arrival of said outputted stored data at said external line sections is at a rate not greater than said output line rate, and buffer overflow and output overflow are prevented.

8. The method of claim 7, wherein said designated rate corresponds to said output line rate.

9. The method of claim 7, wherein said stored data is outputted to said plurality of external line sections at rates corresponding to respective input line rates when output line rates of said plurality of external line sections are at least the corresponding input line rates.

10. The method of claim 7, wherein said external line section is a bufferless component.

* * * * *